Patented July 21, 1942

2,290,345

UNITED STATES PATENT OFFICE 2,290,345

RESINOUS PRODUCT HAVING ANION EXCHANGE PROPERTIES

Easton Melof, Chicago, Ill., assignor to National Aluminate Corporation, Chicago, Ill., a corporation of Delaware No Drawing. Application January 20, 1938, Serial No. 185,931

6 Claims. (Cl. 260—72)

The present invention relates to a condensation product of improved capacity for anion removal and to a process of producing the same.

As is well known, materials capable of removing anions from solutions have been produced heretofore from m-phenylenediamine according to the method of Adams and Holmes, Chemistry & Industry, 54, 4T (1935) by condensation of free diamine, dissolved in an excess of hydrochloric acid, with a large excess of formaldehyde.

The principal object of the present invention is a new and improved process of condensing aryl polyamines with aldehydes, whereby a condensation product of increased anion removal capacity is obtained.

A further object is a method of producing an improved material of the character described from polyamines by condensation with less than the chemical equivalent amount of reactants.

A still further object is an improved anion removal condensation product produced by such a process.

Other objects will appear as the invention is hereafter more fully described.

I have found that the foregoing objects may be achieved by carrying out the condensation between the aryl polyamines and the aldehyde by employing less than one equivalent amount of aldehyde theoretically required for each amino group in the polyamine molecule. Instead of using an excess of condensation agent, I also prefer to employ less than one equivalent amount of such agent, as hereinafter more fully described. The resulting resin has a higher anion removal capacity in consequence of the foregoing procedure.

In order to disclose the nature of my invention more clearly, the following preferred embodiment will now be described. It is to be understood, however, that this is done solely by way of illustration and is not to be construed as a limitation upon the spirit or scope thereof.

550 grams of m-phenylenediamine was crushed and dissolved in 2½ kilograms of water 740 grams of concentrated hydrochloric acid (37%) was then added and the temperature maintained at about 60° C. 600 grams of 40% formaldehyde was then added, and after gelation the material was dried at a temperature sufficient to remove the moisture therefrom, for example, at 100° C., crushed and screened, so that the particles passed through a 14-mesh screen but were held on a 48-mesh screen. 20 grams of the screened material was treated with an excess of dilute alkali metal hydroxide, such as 3% sodium hydroxide solution, and thereafter washed free of the alkali.

The product obtained in the foregoing manner is capable of taking up approximately 14% of its weight of sulfuric acid as against 7% for the product of Adams & Holmes.

The product obtained by this process may be employed to remove acidic compounds generally from solutions thereof, thus, for example, aqueous solutions of mineral acids such as sulfuric acid or hydrochloric acid; or aqueous solutions of organic acids such as the aliphatic acids, for example, acetic acid; or aqueous solutions of acidic salts such as sodium acid sulfate, may be rendered substantially neutral by passing said solutions over the product produced in accordance with my invention. In the case of the acid salts, such as sodium bisulfate, the effluent water contains no bisulfate ion, the material being converted into the neutral salt. Thus, when an aqueous solution of $NaHSO_4$, containing 50 grains per gallon, was passed through my improved anion-removal material, the total solids content was reduced 41% and the effluent water was neutral, the solids being present as $Na_2SO_4$.

The exhausted materials may be regenerated and rendered capable of further anion removal by treatment with an alkaline solution such as a dilute ammonium hydroxide solution or a dilute alkali metal hydroxide, for example, a 3% sodium hydroxide solution.

In the foregoing detailed description of my invention it is apparent that many variations in detail may be made without departing from the spirit and scope thereof. Thus, for example, although m-phenylenediamine is the preferred starting material of my invention, other aryl polyamines may be employed if desired. Thus, for example, the various triamino benzenes, and numerous other aryl polyamines such as the naphthalene diamines, anthracene diamines, and the like, may be employed if desired. The aryl meta polyamines, however, are most desirable, and for economic reasons I prefer to employ m-phenylenediamine.

Furthermore, the invention is not necessarily restricted to the use of formaldehyde, since it is apparent that other aldehydes, such as acetaldehyde and the like, may be employed if desired. Finally, condensing agents other than the hydrohalide may be employed if preferred. Thus, in place of hydrogen chloride, I may use other mineral acids such as sulfuric acid, phosphoric acid, hydrobromic acid, and the like; acid salts such as sodium acid sulfate, and the like; organic acids such as the aliphatic acids, for example, acetic acid, and the like; or I may employ alkaline reacting materials such as the alkali metal hydroxides. Many other condensing agents will be apparent to anyone skilled in the art. The amount of condensing agent employed in accordance with my invention is preferably less than that theoretically required when calculated on the basis of the amino groups in the polyamine employed. Thus, when one mol of m-phenylenediamine is used, less than two mols of hydrochloric acid is to be regarded as less than one equivalent amount of condensing agent.

The product obtained by condensing the polyamine with less than the equivalent amount of aldehyde, in the presence of less than the equivalent amount of a condensing agent, as hereinbefore described, is characterized by markedly improved basicity and greatly enhanced capacity for the removal of anions from solution.

It is apparent to anyone skilled in the art that many variations in detail may be made in the foregoing procedure without departing from the spirit and scope of the present invention. I therefore intend to be limited only in accordance with the following patent claims.

I claim:

1. The process of producing an anion-exchange material, which comprises condensing an aromatic diprimary diamine directly with a sufficient amount of an aldehyde selected from the group consisting of formaldehyde and acetaldehyde, and in the presence of a sufficient amount of an acid as a condensing agent, to produce directly upon drying and without further chemical treatment a solid resinous condensation product which is thermally stable to at least 100° C., said aldehyde and said acid condensing agent being used in the proportions of less than two mols each for every mol of diamine employed, and then heating to dry said product while still in the acid condition until a solid condensation product having pronounced anion-exchange capacity is obtained.

2. The process of claim 1 wherein said diamine comprises m-phenylenediamine, said acid comprises hydrochloric acid, and said product is comminuted to form relatively small particles.

3. The process of producing a solid, anion-exchange material, which comprises condensing an aromatic diprimary diamine directly with a sufficient amount of an aldehyde selected from the group consisting of formaldehyde and acetaldehyde, and in the presence of a sufficient amount of an acid as a condensing agent, to produce directly upon drying and without further chemical treatment a solid resinous condensation product which is thermally stable to at least 100° C., said aldehyde and said acid condensing agent being used in the proportions of less than two mols each for every mol of diamine employed; heating to dry said product while in the acid condition; comminuting the product to form relatively small particles; washing the dried product with a dilute aqueous alkaline solution to remove the uncombined acid condensing agent therefrom, and washing the resulting product with water to remove the excess aqueous alkaline solution; whereby to obtain a solid resinous product in comminuted form having pronounced anion-exchange properties.

4. An anion-removal material of high anion-exchange capacity comprising comminuted particles of the solid, resinous condensation product obtained by condensing an aromatic diprimary diamine directly with a sufficient amount of an aldehyde selected from the group consisting of formaldehyde and acetaldehyde, and in the presence of a sufficient amount of a mineral acid as a condensing agent, to produce directly upon drying and without further chemical treatment a solid resinous condensation product which is thermally stable to at least 100° C., said aldehyde and said acid being used in the proportion of less than two mols each for every mol of diamine employed, and then heating to dry said product while still in the acid condition until a solid condensation product having pronounced anion-exchange capacity is obtained.

5. An anion-removal material of high anion-exchange capacity comprising relatively small particles of the solid, resinous condensation product obtained by condensing m-phenylenediamine with a sufficient amount of formaldehyde, and in the presence of a sufficient amount of hydrochloric acid, to produce directly upon drying and without further chemical treatment a solid resinous condensation product which is thermally stable to at least about 100° C., said aldehyde and said acid being used in the proportions of less than two mols each for every mol of phenylenediamine employed; heating to dry said product while in the acid condition; comminuting the product to form relatively small particles; washing the dried product with aqueous alkali to remove the uncombined acid; and washing the resulting product with water to remove the excess alkali.

6. An anion-removal material of high anion-exchange capacity comprising relatively small particles of a solid, resinous condensation product characterized by thermal stability to at least about 100° C., and obtained by condensing m-phenylenediamine with formaldehyde in the presence of hydrochloric acid, in approximately the proportions by weight of 550 parts m-phenylenediamine, 740 parts concentrated hydrochloric acid, and 600 parts 40% formaldehyde solution; heating to dry said product while in the acid condition; comminuting the product to form relatively small particles, and washing the same with dilute aqueous alkali and then with water.

EASTON MELOF.